United States Patent
Befelein

(10) Patent No.: US 7,270,455 B2
(45) Date of Patent: Sep. 18, 2007

(54) VEHICLE LIGHT AND METHOD OF INDICATING DIFFERENT SIGNAL PATTERNS OF A VEHICLE LIGHT

(75) Inventor: Carsten Befelein, Haar (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 1 day.

(21) Appl. No.: 11/187,013

(22) Filed: Jul. 22, 2005

(65) Prior Publication Data

US 2006/0013012 A1    Jan. 19, 2006

Related U.S. Application Data

(63) Continuation of application No. PCT/EP03/12450, filed on Nov. 3, 2003.

(30) Foreign Application Priority Data

Jan. 23, 2003  (DE) .............................. 103 02 460

(51) Int. Cl.
*F21S 8/10* (2006.01)
(52) U.S. Cl. .................. 362/545; 362/540; 362/541
(58) Field of Classification Search .............. 340/479, 340/464; 362/545, 541, 543, 544, 235
See application file for complete search history.

(56) References Cited

U.S. PATENT DOCUMENTS 3,710,315 A * 1/1973 Scherenberg ............... 340/466
5,785,413 A * 7/1998 Tillinghast et al. ......... 362/228
6,133,852 A   10/2000 Tonkin
6,447,155 B2  9/2002 Kondo et al.
6,717,376 B2 * 4/2004 Lys et al. .................... 315/292
2002/0075148 A1  6/2002 Boyer et al.

FOREIGN PATENT DOCUMENTS

| DE | 196 24 046 A1 | 12/1997 |
|---|---|---|
| DE | 198 20 656 A1 | 11/1999 |
| DE | 199 16 845 A1 | 10/2000 |
| DE | 199 31 712 A1 | 1/2001 |
| DE | 100 60 489 A1 | 6/2002 |
| EP | 0 942 225 A2 | 9/1999 |
| EP | 1 213 531 A2 | 6/2002 |
| JP | 04215539 A * | 8/1992 |

* cited by examiner

*Primary Examiner*—Renee Luebke
*Assistant Examiner*—Mary Zettl
(74) *Attorney, Agent, or Firm*—Crowell & Moring LLP

(57) ABSTRACT

The invention relates to an automotive light which is characterized in that a reflector with at least one first light source associated with the reflector forms a first lighting system whose light can be guided onto a translucent cover pane. The reflector further comprises a screen preceding the light source in relation to the cover pane. The screen is configured as a second, front lighting system having at least one second light source. Both lighting systems can be adjusted to different luminous intensities. The invention also relates to a method for indicating different signal patterns of an automotive light, which is characterized in that two lighting systems which are located one behind the other and whose light-emitting surfaces partially overlap can be individually controlled with different luminous intensities.

4 Claims, 1 Drawing Sheet

VEHICLE LIGHT AND METHOD OF INDICATING DIFFERENT SIGNAL PATTERNS OF A VEHICLE LIGHT

CROSS-REFERENCE TO RELATED APPLICATIONS

This application is a continuation of PCT Application No. PCT/EP2003/012450 filed on Nov. 3, 2003, which claims priority to German Application No. 103 02 460.3 filed Jan. 23, 2003.

BACKGROUND AND SUMMARY OF THE INVENTION

The invention relates to a vehicle light, in the case of which a reflector having at least one first light source assigned to the reflector forms a first light system whose light can be guided onto a light-transmitting cover pane, and having a screen placed in front of the light source toward the cover pane.

The invention also relates to a method of indicating different signal patterns or images of a vehicle light.

The signal pattern of conventional vehicle lights appears either two-dimensionally, when a cover pane of the light is constructed in a transmitting manner as a lens system or, as increasingly implemented in modern lights by lensless clear cover panes, in a three-dimensional manner. As a result of a large overall depth, the three-dimensional appearance can still be intensified. The clear cover panes open up a view into the light interior, so that the technical details of the reflectors and light sources can be seen. Since, in particular, the view into a light disposed in the reflector opening is considered to spoil the visual effect, it is customary to conceal the light sources by the use of screening devices. In this case, it is endeavored, while observing light-related regulations, to integrate these screening devices into a striking light design, which is as individualized as possible.

Simultaneously, the light should have a high functionality. Particularly in the case of rear lights, increased safety requirements with respect to the signal effect of the tail light and the brake light are becoming increasingly important as a result of the shorter braking distances because motor vehicles are equipped with braking assistance systems, such as antilock systems (ABS). For this purpose, it is known, for example, from German Patent documents DE 196 24 046 A1 and DE 199 31 712 A1 to implement braking intensity indications on the rear lights, which provide different signals or signal images as a function of the braking intensity. However, these braking intensity indications are implemented only in a linear formation side-by-side by a rise of the light intensity or by the connection of additional lights, and do not generate three-dimensional signal images or patterns.

From German Patent document DE 198 20 656 A1, a vehicle light is known in the case of which a screen is disposed in front of a light source. The light source is arranged in a light housing at the focal point of a reflector, so that the emitted light is aimed at an end pane covering the light housing. The lighting system formed by the reflector and the light source is part of a multichamber light. In this case, several light systems are provided, one being constructed as a combined tail and brake light. The screen is formed by a shell-shaped circular reflector. This reflector is arranged in an intermediate pane and faces the end pane. The reflector is visible through clear circular areas of the end pane and the intermediate pane, which areas are situated adjacent to the reflector, but the light source itself is covered by the reflector.

It is a disadvantage of known vehicle lights that the reflector, as a passive element, is not very functional. It remains largely unused for the active signal image generation. Furthermore, the reflector can generate only a two-dimensional impression and is therefore not very effective with respect to the design characteristics.

One aspect of the present invention is to make the screening of the light sources in the known vehicle lights more functional, and to improve the lamps such that they generate more striking signal images or patterns, which are more effective with respect to the design.

According to the invention, a vehicle light is provided, in the case of which a reflector having at least one first light source assigned to the reflector forms a first lighting system, whose light can be guided to a light-transmitting cover pane, and having a screen placed in front of the light source toward the cover pane. This is done in such a manner that the screen is constructed as a second lighting system having at least one second light source. The two lighting systems can be set at different luminous intensities.

As a result of the fact that the vehicle light has two lighting systems, arranged one behind the other, three-dimensional "floating effects", which are effective with respect to the signal, can be achieved. The forward lighting system takes up a smaller area in comparison with the rearward lighting system. The smaller area is correspondingly adapted for concealing the light source positioned behind it, while the dimensions of the rearward lighting system are determined by the reflector. The lighting systems can be adjusted to different light intensities. When the forward lighting system shines brighter, it seems to float in front of the darker background. When the rearward lighting system shines brighter, it seems to float next to the darker forward lighting system. The floating effect provides the lighting with a striking signal image and attracts an observer's attention, for example, that of the driver of a vehicle which is following, in a special manner. Furthermore, the floating effect can serve as a special recognition characteristic of a vehicle make equipped therewith. The forward lighting system actively contributes to generating different specific signal images, and is thus more functional than the previous screening devices or reflectors, which operate only as passive elements. In addition, the forward lighting system carries out the function of a screening device for concealing the light source, which is positioned behind it and is assigned to the reflector of the light.

According to a preferred embodiment of the invention, the two lighting systems form a tail light of a rear light. The arrangement of the two lighting systems behind one another is particularly suitable for generating a striking tail light, which is effective with respect to the design. When the forward lighting system shines brighter than the rearward lighting system, the impression of a "floating" tail light is created, that is, of a tail light standing in space. Both lighting systems can radiate at different brightnesses. However, it is also contemplated that only one lighting system is switched on.

According to another preferred embodiment of the invention, the two lighting systems form a brake light of a rear light. By means of the two lighting systems, a brake intensity indication can be implemented in a simple manner, which contributes to increased traffic safety. For this purpose, for example, the forward lighting system can flash during a normal braking operation with a brake light intensity as a "floating brake light". During an emergency braking, the rearward lighting system can be connected in a particularly effective manner with respect to the signal for the traffic which is following. This contributes to increasing safety in road traffic.

The use of the two lighting systems is particularly effective as a combined tail/brake light. When the light is switched on, the tail light intensity can be raised to brake light intensity during a braking operation, so that, in the event of a normal braking operating, the "floating tail light" becomes a "floating brake light" and, in the event of an intense braking, possibly even an emergency braking, an ostensible surface enlargement of the brake light is added.

According to another preferred embodiment of the invention, the light sources of both lighting systems are each constructed as a plurality of red light-emitting diodes; the light-emitting diodes of the first lighting system are arranged on the forward side of a carrier plate essentially forming the screen, which forward side faces the cover pane. The light-emitting diodes of the second lighting system are arranged on the rearward side of the carrier plate.

In principle, both lighting systems can be constructed with all light sources suitable for meeting light-related regulations. For example, the rearward lighting system may conventionally have a bulb which is arranged in the focal point of a reflector. For the forward lighting system, because of its compact construction, a diode arrangement consisting of red light-emitting diodes, positioned preferably on the carrier plate constructed as a printed circuit board, is particularly advantageous. The positioning of another diode arrangement on the backside of the printed circuit board can form the light source of the rearward lighting system. As a result, a particularly cost-effective and production-friendly tail light/brake light combination is implemented.

According td another embodiment of the invention, the cover pane has a lens system in a central area disposed in front of the second lighting system. The clear cover pane may have a colorless or colored, for example, red construction. The lens system, for example, in the shape of a beveled, red-dyed structure, can be used for preventing a direct view onto the light source(s) of the forward lighting system situated behind it, in order to obtain an attractive appearance of the light. The lens system, for example, in the form a lens, can also have the purpose of further increasing the effect of the "floating tail light" and/or of achieving a defined light distribution. It is also contemplated to eliminate the lens system and to only dye the central area. In principle, in the case of an attractive design, a concealing of the forward light sources may also not be necessary.

The known methods of indicating different signal images or patterns of a vehicle light have the disadvantage that they are relatively ineffective in their signal effect.

It is therefore another aspect of the invention to improve the known methods of indicating different signal images of a vehicle light such that their signal effect is improved.

According to the invention, a method is provided for indicating different signal images of a vehicle lamp. The method is characterized in that two lighting systems positioned behind one another, whose radiating surfaces mutually partially overlap, are separately controlled with variable light intensities.

As a result of the fact that the two lighting systems positioned behind one another are controlled with different light intensities, visual floating effects can be achieved, which are effective with respect to the design and the signal. By use of the method, the signal images of the light are better adapted to a respective driving operation situation and are, therefore, used more effectively.

According to a preferred embodiment of the invention, the first lighting system, together with the second lighting system disposed in front of the first lighting system, in a first operation, is controlled as a tail light and, in a second operation, is controlled as a brake light. In the operation as a tail light, the second forward lighting system shines brighter than the first rearward lighting system. And, in the operation as a brake light, when the brake is actuated in a first braking stage, the forward lighting system is switched to a brake light intensity which is greater in comparison to the tail light intensity, and, during a second braking stage with a braking intensity which is significantly greater in comparison to the first braking stage, in addition to the forward lighting system, the rearward lighting system is switched to the brake light intensity.

By controlling the two lighting systems in a tail and brake light with different light intensities, a floating effect is generated, which increases particularly the signal effect of the light for the traffic which is following. The brighter forward light then seems to float in front of the darker rearward light. During a normal braking attempt, that is, the first braking stage, the light intensity of the forward lighting system is switched to brake light intensity. During an intensified braking corresponding to the second braking stage (emergency braking), in addition to the forward lighting system, the rearward lighting system is switched to brake light intensity. The thereby generated surface enlargement of the brake light is interpreted by the driver, who is following, as a sudden visual approach. This information, which is subconsciously present automatically, that is, without requiring a learning process, leads to an intensified braking reaction. In principle, intermediate stages are also contemplated during which the brake light intensities of the two lighting systems differ, so that, in addition to the enlarging effect of the illuminated surface, the light intensity of the brake light also varies. The effect of the floating tail light or of the floating brake light is, therefore, connected in a simple and cost-effective manner with the indication of the braking intensity. In this case, the screening device, constructed as an additional lighting system, is effectively included in the signal image generation and the signal effect of the light as a whole is improved.

Additional details of the invention are found in the following detailed description and the attached drawings, in which preferred embodiments of the invention are illustrated as examples.

DETAILED DESCRIPTION OF THE DRAWINGS

A vehicle light consists essentially of a reflector 3, a first light source 6, 6', a second light source 5, and a cover pane 1.

Figure 1:
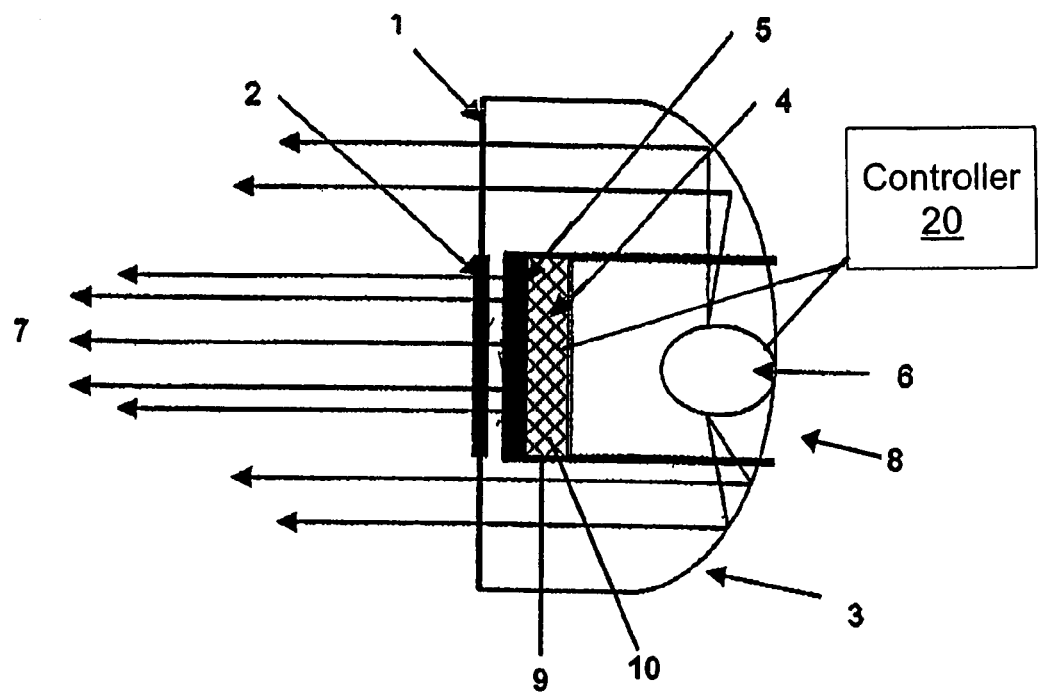
FIG. 1 is a lateral sectional view of a vehicle light with a first rearward lighting system and a second forward lighting system.

The vehicle light illustrated in FIG. 1 is constructed as a rear light with a combined tail light/brake light. The components of the rear light are arranged in a light housing (not shown). The reflector 3 is covered by the cover pane 1 in the radiating direction. The cover pane 1 is constructed as a clear pane. A light source 6 is assigned to the reflector 3. The light source 6 and the reflector 3 form a first lighting system 8. The light source 6 is constructed as a red-dyed bulb arranged at the focal point of the reflector 3. The reflector 3 is used as a joint tail light/brake light reflector 3.

A second lighting system 4 is disposed in front of the first lighting system 4 in the direction of the cover pane 1. The lighting system 4 has the light source 5. The light source 5 is constructed as a circular diode array constructed of red light-emitting diodes (LED), which array is arranged on a carrier plate 10 constructed as a printed circuit board. In a manner known per se, the lighting system 4 is fastened by a holding device 9 constructed as a ring-type holding device on the reflector 3 such that the radiation originating from the light source 6 impinges unhindered on the reflector 3 and the emitted light can then be radiated in the radiating direction 7.

The fastening of the lighting system 4 can also be implemented on a fastening device situated behind the reflector 3. The lighting system 4 conceals the light source 6 situated behind it, so that the light source 6 is not visible to an observer through the cover pane 1 from the outside. In a central area 2, the cover pane 1 has a circular lens system having approximately the diameter of the diode array 5 situated behind it.

Figure 2:
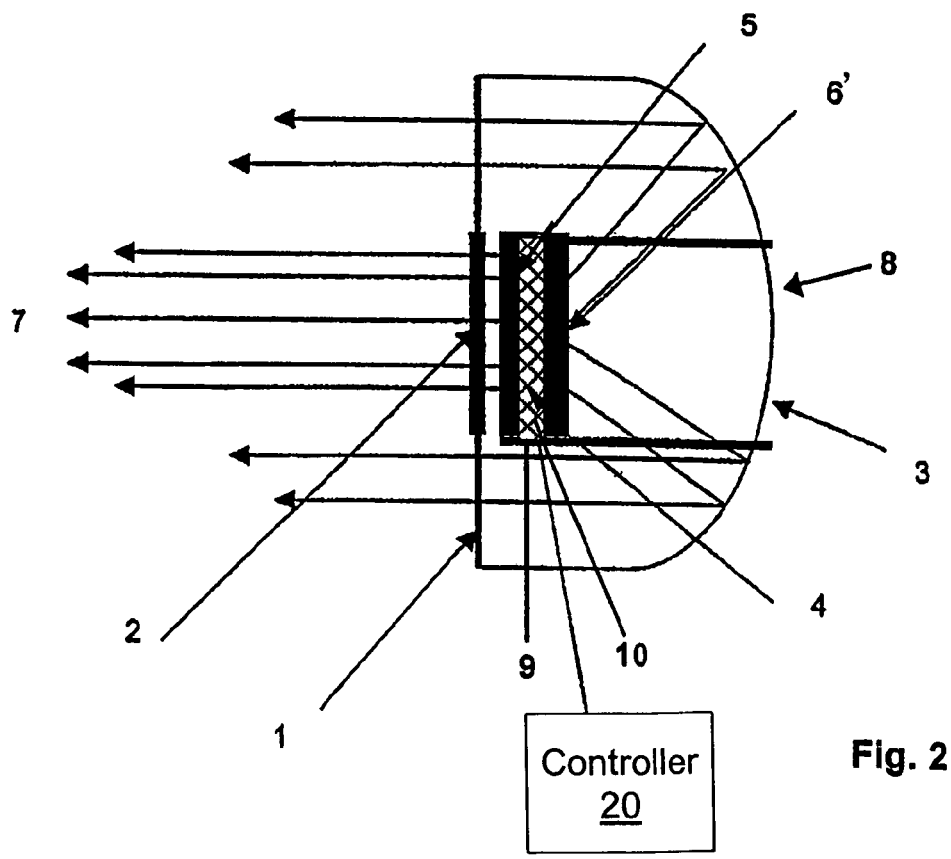
FIG. 2 is a view of the vehicle light of FIG. 1 with a second embodiment of the rearward lighting system.

In the embodiment illustrated in FIG. 2, the light source 6' is provided instead of the light source 6. The light source 6' consists of another diode array, which is similar to the diode array 5, and which is arranged on the backside of the carrier plate 10 of the light system 4. The diode array 6' on the backside of the carrier plate 10 is positioned approximately in the focal point of the reflector 3. The diode array 6' radiates in the direction of the reflector surface, from where the reflected light is, in turn, radiated in the radiating direction 7.

A method of indicating different signal images of a vehicle light is essentially based on an individual separate, control of two lighting systems 4, 8, of a combined tail light/brake light positioned behind one another by controller 20.

The rear light illustrated in FIGS. 1 and 2 is used with the method of generating different signal images. For generating a "floating tail light", the forward lighting system 4 is controlled to have a greater light intensity than the rearward lighting system 8. This leads the observer of the signal image or pattern to see a bright circular pane, which seems to stand in space in front of a less brightly shining larger pane positioned in the background.

In a second operation, the two lighting systems 4, 8 are used as a braking intensity indication. In the case of a normal braking attempt (braking stage 1), that is, during an operation of a brake pedal with an average intensity customary in the driving operation, the forward lighting system 4 is controlled with a brake light intensity. When the tail light is switched on, the tail light intensity is raised to the greater brake light intensity. This results in the image of a "floating brake light".

In the case of a significantly greater braking operation (braking stage 2), the rearward lighting system 8 is connected. This significantly enlarges the flashing surface in that the surface area of the two lighting systems 4, 8 radiating through the cover pane 1 are added up. A signal image or pattern therefore appears, which differs from that of a normal braking attempt, such that a sudden approach is signaled to the following traffic. This leads to an automatic, immediate, braking reaction or at least to an increased braking readiness and a slowing-down of the traffic which is following.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle light, comprising:
   a reflector;
   a light-transmitting cover pane;
   at least one first light source assigned to the reflector in order to form a first lighting system, light from the at least one first light source being emitted from the light-transmitting cover pane via the reflector; and
   a screen arranged in front of the at least one first light source in a direction of the cover pane, wherein the screen is constructed as a second lighting system including at least a second light source,
   wherein light intensities of the first and second lighting systems are individually adjustable to form a tail light and brake light in such a way that the first and second lighting systems both produce light to form the tail light and brake light, wherein the first and second light sources are each constructed as a plurality of red light-emitting diodes, wherein the red light-emitting diodes of the second lighting system are arranged on a forward side of a carrier plate that forms the screen, the forward side facing the cover pane; and
   wherein the red light-emitting diodes of the first lighting system are arranged on a rearward side of the carrier plate facing the reflector.

2. A vehicle light according to claim 1, wherein the cover pane includes a lens system arranged in a central area situated in front of the second lighting system.

3. A vehicle light, comprising:
   a reflector;
   a light-transmitting cover pane;
   at least one first light source assigned to the reflector in order to form a first lighting system, light from the at least one first light source being emitted from the light-transmitting cover pane via the reflector; and
   a screen arranged in front of the at least one first light source in a direction of the cover pane, wherein the screen is constructed as a second lighting system including at least a second light source,
   wherein light intensities of the first and second lighting systems are individually adjustable to form a tail light and brake light in such a way that the first and second lighting systems both produce light to form the tail light and brake light,
   wherein during a braking operation respective light intensities of the first and second lighting systems are switched to a brake light intensity greater in comparison to a respective tail light intensity as a function of the braking intensity,
   wherein the first and second light sources are each constructed as a plurality of red light-emitting diodes, wherein the red light-emitting diodes of the second lighting system are arranged on a forward side of a carrier plate that forms the screen, the forward side facing the cover pane; and
   wherein the red light-emitting diodes of the first lighting system are arranged on a rearward side of the carrier plate facing the reflector.

4. A vehicle light, comprising:
   a reflector;
   a light-transmitting cover pane;
   at least one first light source assigned to the reflector in order to form a first lighting system, light from the at least one first light source being emitted from the light-transmitting cover pane via the reflector; and
   a screen arranged in front of the at least one first light source in a direction of the cover pane, wherein the screen is constructed as a second lighting system including at least a second light source,
   wherein light intensities of the first and second lighting systems are individually adjustable to form a tail light and brake light in such a way that the first and second lighting systems both produce light to form the tail light and brake light, wherein during a braking operation a size of a flashing surface of the cover pane is variable as a function of a braking intensity by individually adjusting the light intensities of the first and second lighting systems, wherein the first and second light sources are each constructed as a plurality of red light-emitting diodes, wherein the red light-emitting diodes of the second lighting system are arranged on a forward side of a carrier plate that forms the screen, the forward side facing the cover pane; and wherein the red light-emitting diodes of the first lighting system are arranged on a rearward side of the carrier plate facing the reflector.

* * * * *